United States Patent
Ikeno

(10) Patent No.: US 8,582,185 B2
(45) Date of Patent: Nov. 12, 2013

(54) IMAGE READER AND CORRECTION PROCESS FOR READ IMAGE

(75) Inventor: Takahiro Ikeno, Seto (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1218 days.

(21) Appl. No.: 11/682,688

(22) Filed: Mar. 6, 2007

(65) Prior Publication Data

US 2007/0206235 A1 Sep. 6, 2007

(30) Foreign Application Priority Data

Mar. 6, 2006 (JP) ................................. 2006-060111

(51) Int. Cl.
*H04N 1/04* (2006.01)

(52) U.S. Cl.
USPC ........... 358/496; 358/488; 358/498; 399/367; 399/406

(58) Field of Classification Search
USPC .......... 399/367, 371, 406, 211; 358/488, 496, 358/498, 505; 271/114, 10.03, 10.11; 347/101
See application file for complete search history.

(56) References Cited

U.S. PATENT DOCUMENTS

| | | | | |
|---|---|---|---|---|
| 5,749,040 | A | * | 5/1998 | Muramatsu .................... 399/406 |
| 5,933,698 | A | * | 8/1999 | Muramatsu .................... 399/406 |
| 6,111,667 | A | * | 8/2000 | Mishima et al. .............. 358/488 |
| 6,131,898 | A | * | 10/2000 | Hiroi et al. .................. 271/10.03 |
| 6,234,470 | B1 | * | 5/2001 | Okitsu et al. .................. 271/114 |
| 6,731,412 | B1 | * | 5/2004 | Imamura ....................... 358/498 |
| 7,633,656 | B2 | * | 12/2009 | Miyahara ...................... 399/367 |
| 2002/0036808 | A1 | * | 3/2002 | Tohyama et al. .............. 358/497 |
| 2002/0080429 | A1 | * | 6/2002 | Honbo et al. .................. 358/505 |
| 2003/0227125 | A1 | * | 12/2003 | Nakamura .................... 271/10.11 |
| 2005/0135840 | A1 | * | 6/2005 | Sakurai et al. ................. 399/211 |
| 2005/0201787 | A1 | * | 9/2005 | Nakamura ..................... 399/367 |
| 2006/0013627 | A1 | * | 1/2006 | Choi ............................. 399/367 |
| 2006/0028698 | A1 | * | 2/2006 | Chen et al. .................... 358/498 |
| 2006/0268087 | A1 | * | 11/2006 | Sasa ............................. 347/101 |

FOREIGN PATENT DOCUMENTS

| | | |
|---|---|---|
| JP | H10-186535 A | 7/1998 |
| JP | H10-327321 A | 12/1998 |
| JP | 2001056515 A | 2/2001 |
| JP | 2002176540 A | 6/2002 |
| JP | 2002185796 A | 6/2002 |
| JP | 2003-032442 A | 1/2003 |
| JP | 2003-078765 A | 3/2003 |
| JP | 2003-087523 A | 3/2003 |
| JP | 2004-320538 A | 11/2004 |

OTHER PUBLICATIONS

Japan Patent Office; Notice of Reasons for Rejection in Japanese Patent Application No. 2006-060111 mailed Jun. 26, 2009.

* cited by examiner

*Primary Examiner* — Twyler Haskins
*Assistant Examiner* — Nicholas Pachol
(74) *Attorney, Agent, or Firm* — Baker Botts L.L.P.

(57) ABSTRACT

According to an embodiment of the present invention, an image reader comprises a plurality of light receiving elements configured to receive light from an object to be read and to convert the light into image signals. The image reader further comprises means for determining a distance between the object and the plurality of light receiving elements at a plurality of different positions of the object. Moreover the image reader comprises means for selecting at least one correction process portion based at least on the distance between the object and the plurality of light receiving elements. The image reader comprises means for applying the at least one selected correction process to the image signal.

28 Claims, 17 Drawing Sheets

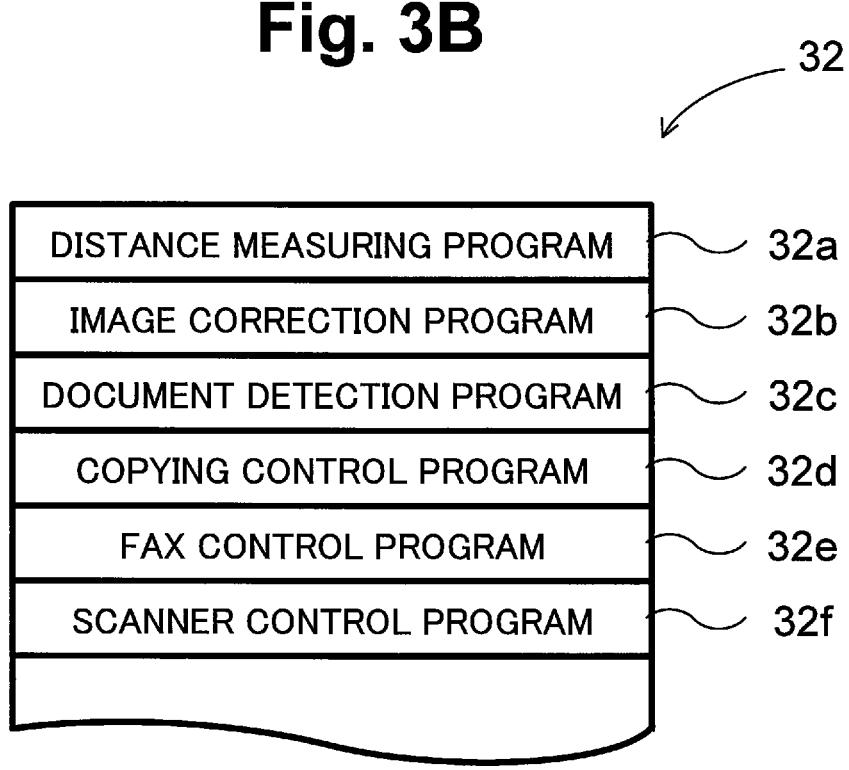

Fig. 9A

| MATRIX COEFFICIENT | | |
|---|---|---|
| n11 | n12 | n13 |
| n21 | n22 | n23 |
| n31 | n32 | n33 |

Fig. 9B

| PIXEL DATA VALUE | | |
|---|---|---|
| p11 | p12 | p13 |
| p21 | p22 | p23 |
| p31 | p32 | p33 |

Fig. 9C $$P = \left( \frac{\sum_{i=1}^{3} \sum_{j=1}^{3} (P_{ij} \times n_{ij})}{\sum_{i=1}^{3} \sum_{j=1}^{3} (n_{ij})} \right)$$

Fig. 9D

| SMOOTHING | | |
|---|---|---|
| 1 | 2 | 1 |
| 2 | 4 | 2 |
| 1 | 2 | 1 |

Fig. 9E

| EMPHASIZING | | |
|---|---|---|
| 0 | −4 | 0 |
| −4 | 20 | −4 |
| 0 | −4 | 0 |

Fig. 16

| TYPE OF DOCUMENT | THICKNESS |
|---|---|
| PLAIN PAPER | 0.1 |
| GLOSSY PAPER | 0.2 |
| INK JET SPECIAL PAPER | 0.15 |

IMAGE READER AND CORRECTION PROCESS FOR READ IMAGE

CROSS REFERENCE TO RELATED APPLICATION

The present application claims priority from Japanese Patent Application No. 2006-060111, filed on Mar. 6, 2006, the disclosure of which is incorporated herein by reference in its entirety.

FIELD OF THE INVENTION

The present invention relates to image readers.

BACKGROUND OF THE INVENTION

A known image reader for reading a document is mounted on a facsimile, a copier, a scanner, or a combination thereof. The known image reader includes an auto document feeder ("ADF") reading mechanism which automatically conveys a document, or an flat bed ("FB") reading mechanism which reads an image. The ADF reading mechanism automatically conveys the document on a contact glass, radiates light to the document from a side opposite to the contact glass, and reads a reflection light by the image sensor to obtain the image of the document as image signals.

The ADF reading mechanism includes a guide plate which is biased toward the contact glass by a spring, and the document is conveyed between the guide plate and the contact glass. When a resilient document such as a glossy paper, is conveyed, the guide plate is raised, which may cause the document to float. Particularly, when a close-contact-type image sensor is used as the image sensor, a focal length of the image sensor is relatively short and consequently, when the document floats, it is difficult to obtain accurate focusing, e.g., it is difficult to obtain a clear image and focused.

SUMMARY OF THE INVENTION

Therefore a need has arisen for image readers which overcome these and other shortcomings of the related art. A technical advantage of the present invention is that the image reader may maintain a quality image regardless of any floating of the document.

According to an embodiment of the present invention, an image reader comprises a plurality of light receiving elements configured to receive light from an object to be read and to convert the light into image signals. The image reader further comprises means for determining a distance between the object and the plurality of light receiving elements at a plurality of different positions of the object. Moreover the image reader comprises means for selecting at least one correction process portion based at least on the distance between the object and the plurality of light receiving elements. The image reader comprises means for applying the selected at least one correction process to the image signal. For example, the various means in this embodiment may comprise a processor which is configured to execute software.

According to another embodiment of the present invention, an image reader comprises a first plurality of light receiving elements configured to receive light from an object to be read and to convert the light into image signals. The image reader is configured to move the object in a predetermined direction. The image reader further comprises a guide plate configured to guide the object and a second plurality of light receiving elements configured to read the guide plate. The image reader still further comprises means for determining a distance between the object and the first plurality of light receiving elements at a plurality of different positions of the object. Moreover the image reader comprises means for selecting at least one correction process portion based at least on the distance between the object and the first plurality of light receiving elements. The image reader comprises means for applying the selected at least one correction process to the image signal. For example, the various means in this embodiment may comprise a processor which executed software.

Other objects, features, and advantages will be apparent to persons of ordinary skill in the art from the following detailed description of the invention and the accompanying drawings.

BRIEF DESCRIPTION OF THE DRAWINGS

For a more complete understanding of the present invention, the needs satisfied thereby, and the features and technical advantages thereof, reference now is made to the following descriptions taken in connection with the accompanying drawings.

FIG. 3B is an explanatory view of a memory region of a ROM of the control portion of FIG. 3A.

FIG. 9A-9E are explanatory views for explaining emphasis processing.

FIG. 16 is an explanatory view of a table which may indicate a correspondence between a type and a thickness of the document.

DETAILED DESCRIPTION OF THE INVENTION

Embodiments of the present invention and their features and technical advantages may be understood by referring to FIGS. 1-16, like numerals being used for like corresponding portions in the various drawings.

Figure 1:
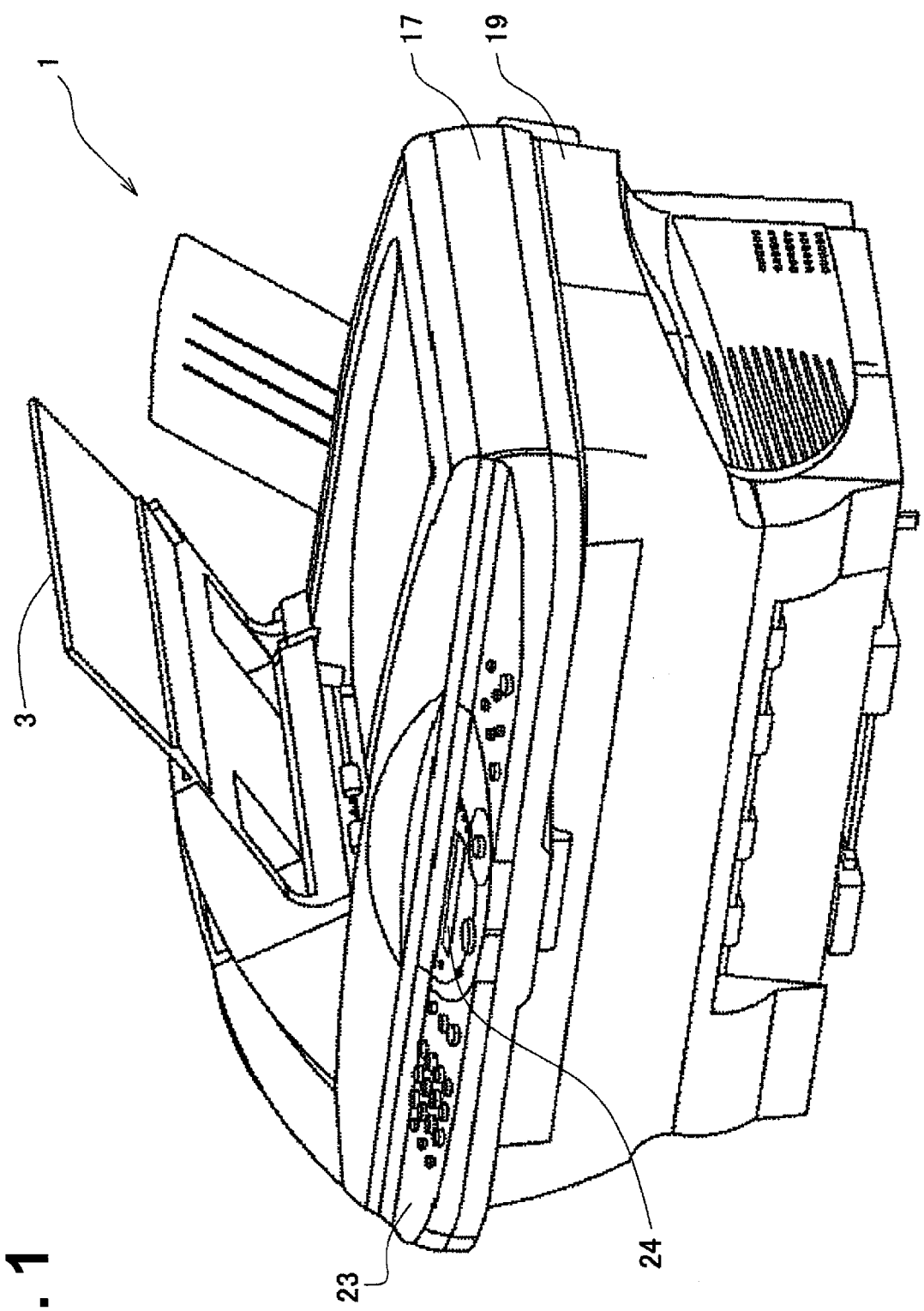
FIG. 1 is a perspective view of a multi-function machine which comprises an image reader, according to an embodiment of the present invention.

Referring to FIGS. 1 and 2, the multi-function machine 1 may perform a plurality of functions, such as a fax function, a scanning function, and a copying function. The multi-function machine 1 may comprise an ADF reading mechanism comprising auto document feeder ("ADF") document set tray 3, an document guide 5, sheet feed rollers 7a-7d, a contact glass 11, an image sensor 21, a guide plate 12, and a spring member 13 which biases the guide plate 12. The multi-function machine 1 also may comprise a flat bed ("FB") reading mechanism in which a FB pushing plate 17, an FB platen 19 comprising glass, and the image sensor 21.

Figure 2A:
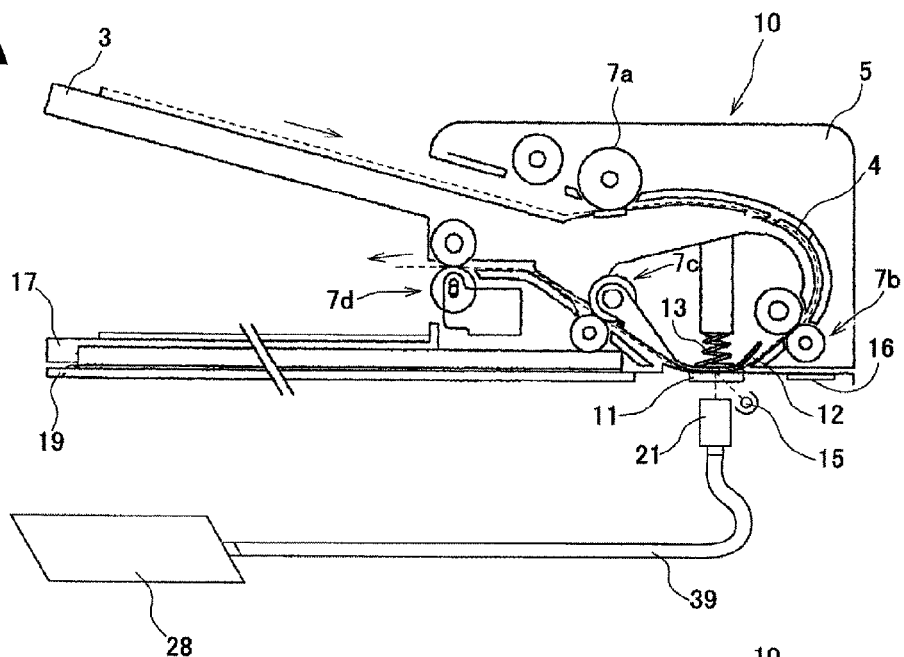
FIG. 2A is an explanatory view of an operation of an ADF reading mechanism.
Figure 2B:
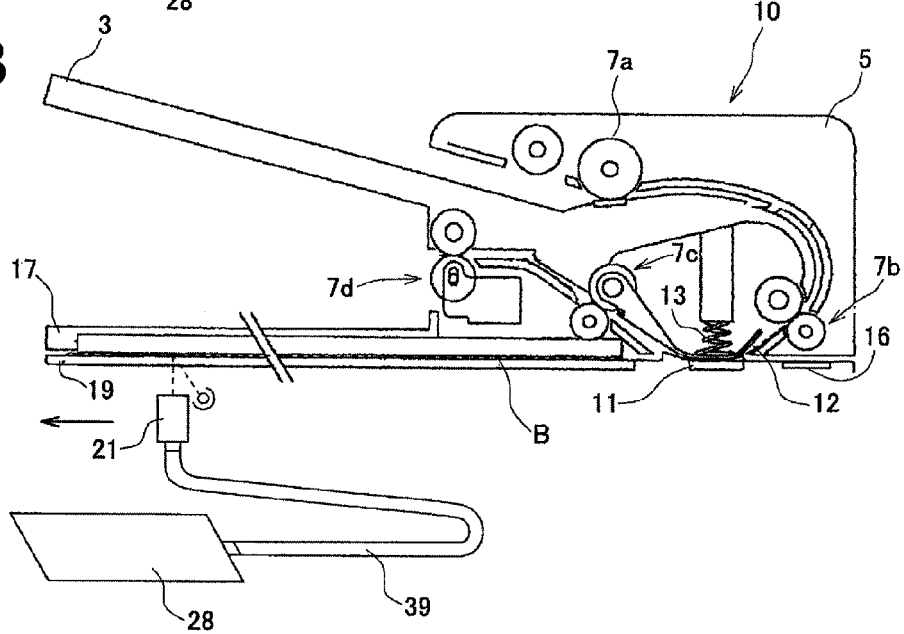
FIG. 2B is an explanatory view of an operation of an FB reading mechanism.

Referring to FIG. 2A, when an image is read using the ADF reading mechanism, a document 4 initially may be positioned on the ADF document set tray 3, and then a reading operation may be instructed. The document 4 may be conveyed by rotating the sheet feeding rollers 7a-7d, and the document 4 may pass between the guide plate 12 and the contact glass 11. The image sensor 21 which is arranged below and relatively close to the contact glass 11 may be an image of the document 4 via the contact glass 11. Alternatively, referring to FIG. 2B, when an image is read using the FB reading mechanism, the document B first may be positioned on the FB platen 19, and the document B then may be pushed to the FB platen 19 by the FB pushing plate 17. The image sensor 21 then may read the image of the document B while moving in the sub-scanning direction indicated by an arrow shown in FIG. 4B.

Further, a reference white plate 16 may be positioned on a lower portion of the document guide 5 for adjusting the white reference of the image sensor 21.

Figure 3A:
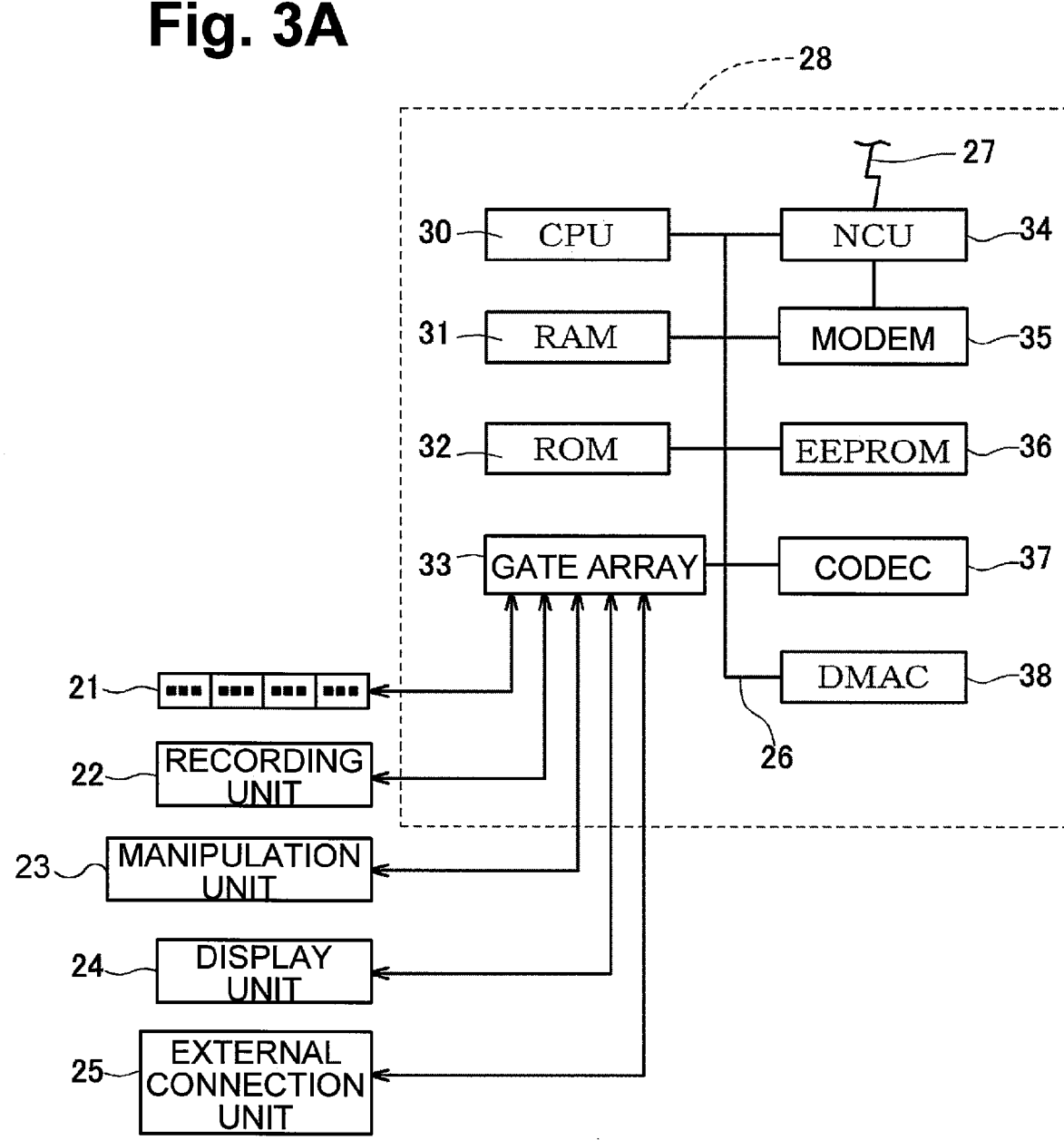
FIG. 3A is a block diagram of a control portion of the multi-function machine of FIG. 1.

Referring to FIG. 3A, the multi-function machine 1 also may comprise a main board 28. The main board may comprise a CPU 30, a RAM 31, a ROM 32, a gate array 33, an Network Control Unit ("NCU") 34, a modem 35, an EEPROM 36, a CODEC 37, a Direct Memory Access Controller ("DMAC") 38 or the like. These parts may be connected to each other through a bus line 26. The bus line 26 may comprise an address bus, a data bus, and control signal lines. Moreover, the image sensor 21, a recording unit 22, a manipulation unit 23, a display unit 24, and an external connection unit 25 may be connected to the gate array 33. A public telephone line 27 may be connected to the NCU 34.

The RAM 31 may be used as a line buffer memory for the read image and as an operation region of the CPU 30, the modem 35 may perform modulation, demodulation, and the like of facsimile data. The EEPROM 36 may store various types of flags, predetermined information, or the like. Alternatively, the gate array 33 may perform as an input/output interface between the CPU 30 and respective parts, such as image sensor 21. The CODEC 37 may perform coding and decoding of the facsimile data, the DMAC 38 may read data into the RAM 31 and may read data from the RAM 31.

The recording unit 22 may comprise a laser printer and may record an image to a recording sheet. The manipulation unit 23 may transmit manipulation signals to the CPU 30 in response to a user operating a manipulation button. The manipulation unit 23 also may be used when a thickness or a type of the document 4 is selected. The display unit 24 may comprise a Liquid Crystal Display ("LCD") and may display an operation state of the multi-function machine 1. The external connection unit 25 may be used when an external device, such as a personal computer, is connected to the multi-function machine 1.

Referring to FIG. 3B, various programs, such as a distance measuring program 32a, an image correction program 32b, a document detection program 32c, a copying control program 32d, a facsimile control program 32e or a scanner control program 32f are stored in the ROM 32. The distance measuring program 32a may be a program for measuring distances between the object to be read and the light receiving elements. The object to be read may be a document. Further, the image correction program 32b may be a program for applying a predetermined correction process to the image signals in response to the distances measured by the distance measuring program 32a. The document detection program 32c may be a program for detecting the thickness or the type of the document 4. For example, the user may input the thickness or the type of the document 4 via the manipulation unit 23. Further, the image reader also may comprise a sensor, and the thickness or the type of the document 4 may be detected based on the information from the sensor. In this embodiment, the copying control program 32d, the FAX control program 32e, and the scanner control program 32f are programs for controlling the copying function, the fax function, and the scanning function, respectively.

Figure 4:
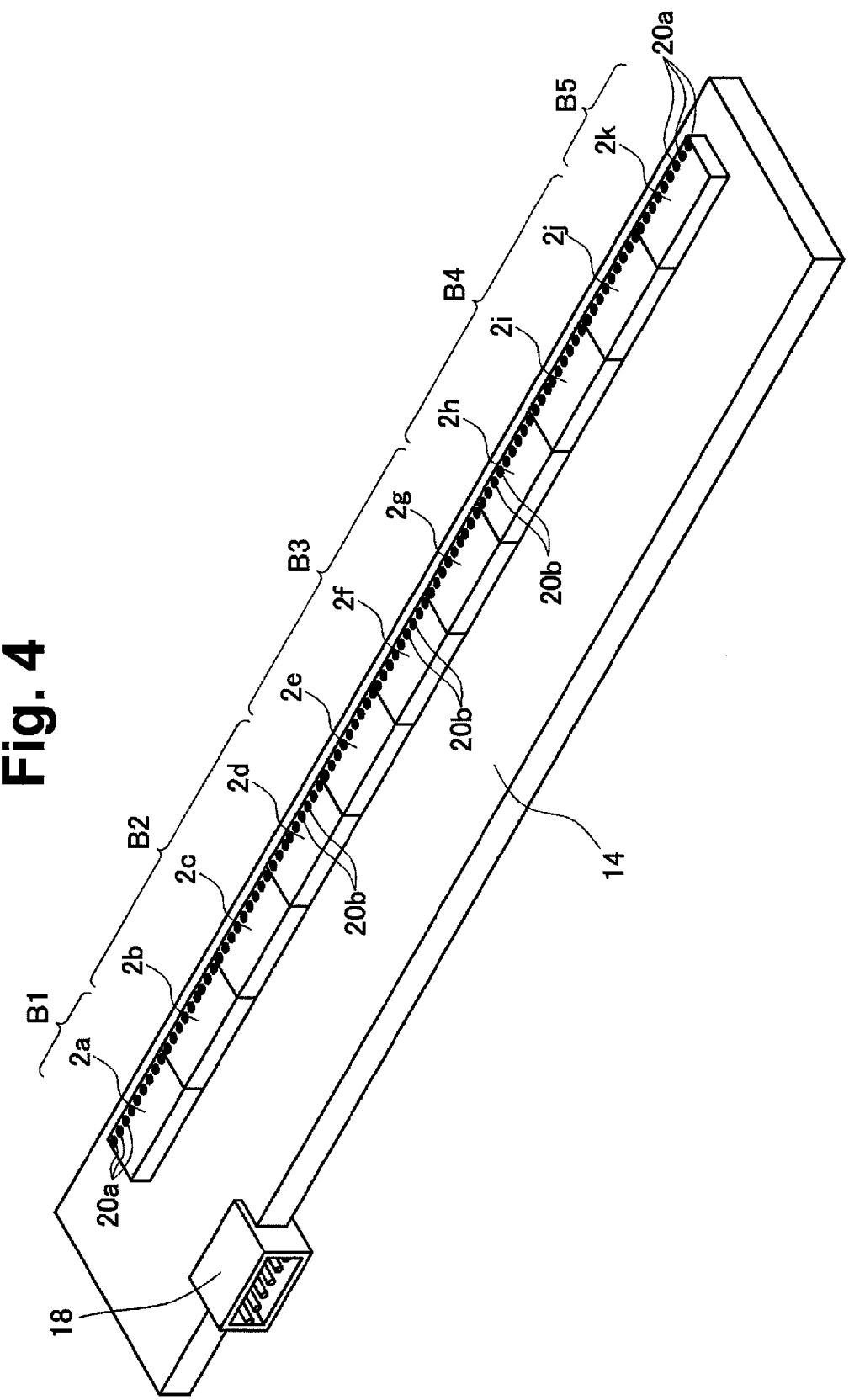
FIG. 4 is a perspective view of an image sensor.

Referring to FIG. 4, the image sensor 21 may comprise a plurality of sensor IC chips 2a, 2b, 2c, 2d, 2e, 2f, 2g, 2h, 2i, 2j, and 2k arranged on a substrate. Each of the IC chips 2 may comprise a plurality of light receiving elements 20 formed thereon. The plurality of light receiving elements 20 may be arranged in a line at a predetermined interval in the main scanning direction orthogonal to the sub-scanning direction. Moreover, the sensor IC chips 2a-2k may be divided into a plurality of blocks, e.g., blocks B1-B5.

Referring to FIG. 5, the sensor IC chips 2 and the substrate 14 may be positioned within a frame 49 with a light source 15, a light guide portion 46, and a lens array 47. The light source 15 may comprise light emitting elements 15R, 15G, and 15B which emit light of red, green, and blue respectively, and hence, white light may be outputted from the light source. The light emitted from the light source 15 passes through the light guide unit 46 and the contact glass 11 and is radiated to the document 4. The light reflected from the document 4 passes through the contact glass 11 and the lens array 47 and reaches the plurality of light receiving elements 20. The plurality of light receiving elements 20 which receive the reflected light output image signals, and the image signals are transmitted to the main board 28 via a connector 18 and a flexible flat cable 39.

Figure 14:
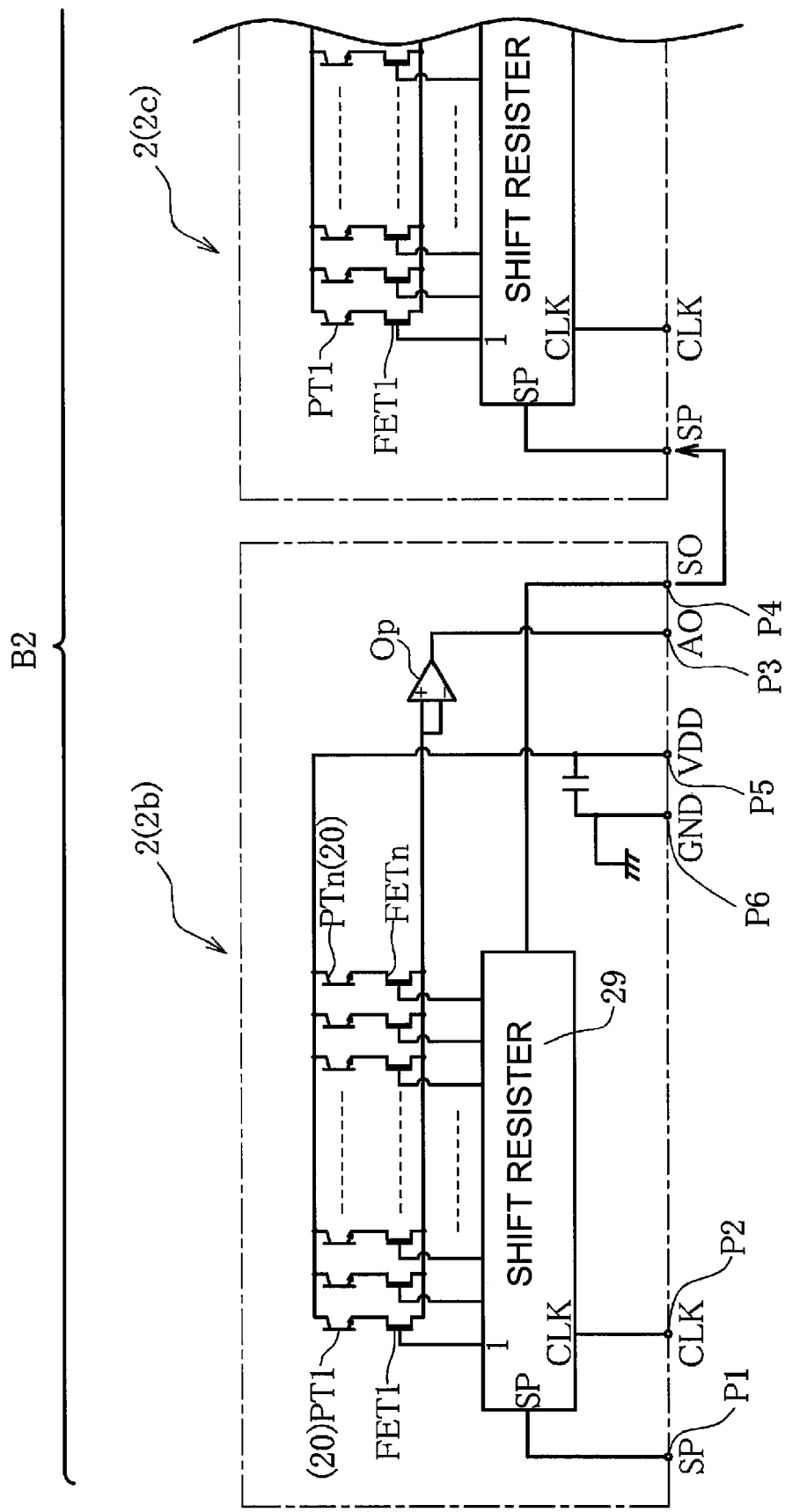
FIG. 14 is a block diagram of a mechanism of the image sensor.

As shown in FIG. 14, the image sensor IC chip 2 may comprise known photo transistors PT1-PTn which may comprise, for example, several thousands light receiving elements 20. The photo transistors PT1-PTn, upon reception of light, store charges corresponding to received light quantities. The circuit of the image sensor IC chip 2 may be substantially similar to the circuit of a known image sensor IC chip.

Figure 15:
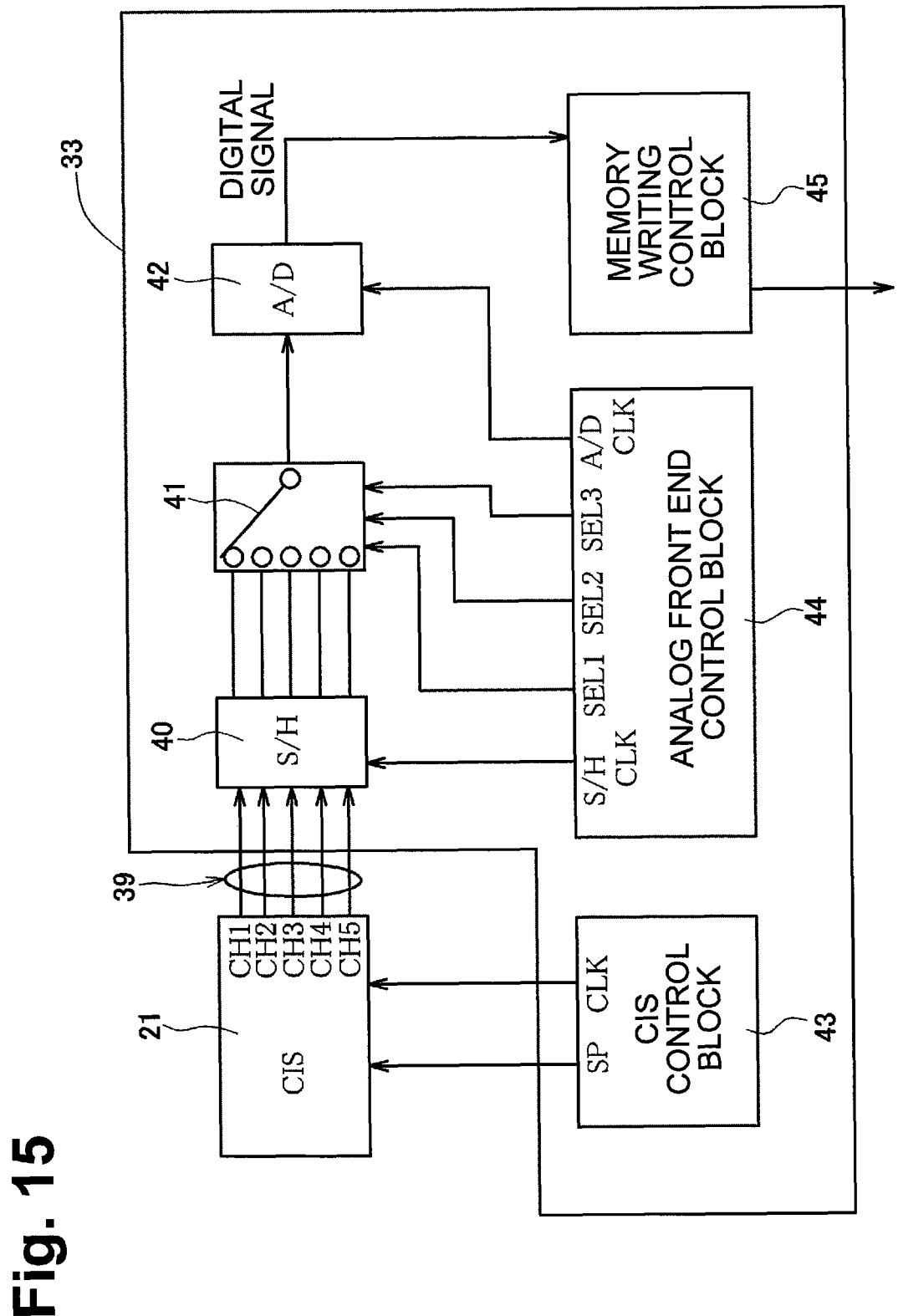
FIG. 15 is an explanatory view of the flow of signals from the image sensor.

Referring to FIG. 15, the gate array 33 may comprise a CIS control block 43 which supplies a start pulse SP, a clock signal CLK, and the like to the image sensor 21 under a systematic control of the CPU 30. The gate array 33 also may comprise an analog front end ("AFE") circuit which may comprise a sample holding circuit ("S/H") 40, a multiplexer 41, and an analog/digital converter ("A/D") 42, an AFE control block 44 which transmits various control signals to the AFE circuit, a memory writing control block 45 which samples and sequentially writes digital signals outputted from the analog/digital converter 42 into a predetermined region of an image memory contained in the RAM 31, and the like.

The start pulse SP may be inputted to the image sensor IC chips 2a and 2k with respect to the blocks B1-B5, and may be inputted to the respective left image sensor IC chips 2b, 2e, and 2h with respect to the blocks B2-B4. Referring to FIG. 14, for example, to the image sensor IC chip 2c at the center of the block B2, a serial out signal SO may be outputted from a terminal P4 of the left image sensor IC chip 2b, and the driving of the left image sensor IC chip 2b may begin upon inputting of the serial out signal SO as the start pulse SP. Image sensor IC chips 2 of other block B3-B4 may operate substantially the same way. The driving of the center image sensor IC chips 2e, 2f, and 2i may begin after the driving of the left image sensor IC chips 2b, 2e, and 2h is finished in each of the blocks B2-B4. When the driving of the center image sensor IC chips 2c, 2f and 2i is finished, the driving of the right image sensor IC chips 2d, 2g, and 2j may begin. Here, the clock signal CLK which is transmitted from the gate array 33 may be inputted to eleven image sensor IC chips 2a-2k) respectively in division.

When a reading operation of the document 4 begins in response to an operation of the manipulation unit 23 by a user, the start pulse SP outputted from the gate array 33 may be inputted to a terminal P1, and a shift register 29 sequentially brings a plurality of transistors FET1-FETn into an ON state in the predetermined direction in response to the clock signal CLK inputted to a terminal P2. Then, charges which are stored in the plurality of phototransistors PT1-PTn may be discharged in a predetermined order, may be amplified by an amplifier Op, and thereafter, may be outputted in series from a terminal P3 as image signals AO. The image signals AO may be analog signals. The image sensor IC chip 2 also may comprise a terminal P4 which outputs a serial out signal SO at a point of time that the image signal is outputted from the final phototransistor PTn. Further, the image sensor IC chip 2 also may comprise a voltage VDD applying terminal P5 for supplying drive electricity necessary for operating the respective parts in the inside of the image sensor IC chip 2, and a terminal P6 which is connected to a ground GND.

For example, in the block B2, when the start pulse SP is inputted to the terminal P1 of the image sensor IC chip 2b, the image signal AO may be outputted from the terminal P3 in response to the clock signal CLK. After the FETn assumes an ON state in response to the clock signal CLK, e.g., after the image sensor IC chip 2b finishes outputting the image signal AO, the serial out signal SO may be outputted from the terminal P4 and may be inputted to the image sensor IC chip 2c as the start pulse SP of the image sensor IC chip 2c. Thereafter, the serial out signal SO of the image sensor IC chip 2c may be outputted in the same manner and may be inputted to the image sensor IC chip 2d as the start pulse SP of the image sensor IC chip 2d. Then, the image signal of the image sensor IC chip 2d may be outputted from the output terminal Ch2.

Referring to FIG. 15, respective analog read signals outputted from respective output terminals Ch1-Ch5 of blocks B1-B5 of the image sensor 21 may be transmitted to the gate array 33 via the flexible flat cable 39, and may be temporarily stored until the respective image signals become stable at predetermined output levels in the sample holding circuit 40. Thereafter, the analog read signals may be sequentially subjected to analog/digital conversion based on instructions from the AFE control block 44.

Figure 5A:
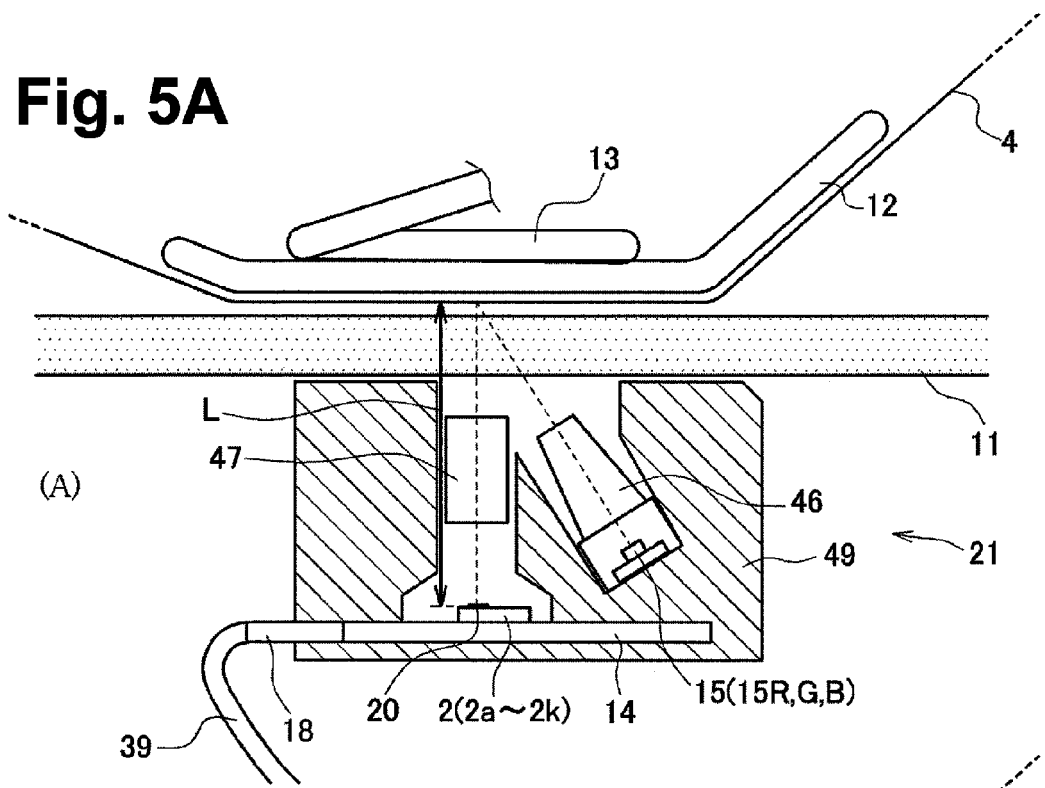
FIG. 5A is an explanatory view of an image sensor when a sheet having a relatively small resiliency is conveyed.
Figure 5B:
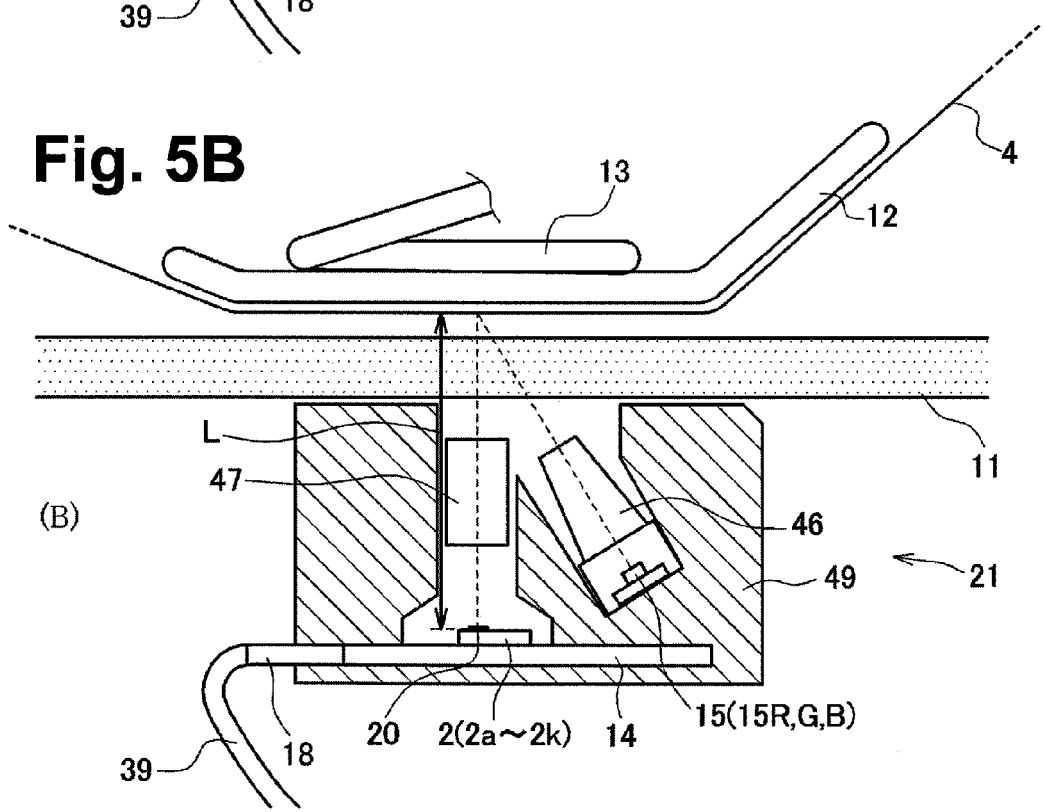
FIG. 5B is an explanatory view of the image sensor when a sheet having a relatively large resiliency is conveyed.

Referring to FIG. 5A and FIG. 5B, as described above, the guide plate 12 may be biased by the spring member 13. In conveying a sheet having relatively little resiliency, such as a plain paper, the document 4 may pass a position where accurate focusing is obtained, as shown in FIG. 5A, and hence, it is possible to obtain an image of relatively high resolution. Nevertheless, when a document having a substantial amount of resiliency, such as an ink jet special paper, is conveyed, the resiliency of the spring member 13 is affected by the resiliency of the document, and hence, the document 4 may float together with the guide plate 12, as shown in FIG. 5B. In FIG. 5B, due to the floating of the document 4, a distance L from the plurality of light receiving element 20 to the document 4 is greater than the corresponding distance L, in the state shown in FIG. 5A. In such a state, the plurality of light receiving element 20 may not be able to obtain accurate focusing, and hence, the resolution of the image may be decreased.

This drawback particularly arises when the size of the image reader is reduced. When the size of the image reader is reduced, a curvature of a conveying path is decreased, and hence, the guide plate 12 may be particularly susceptible to floating when the document 4 having substantial resiliency is conveyed.

Figure 6:
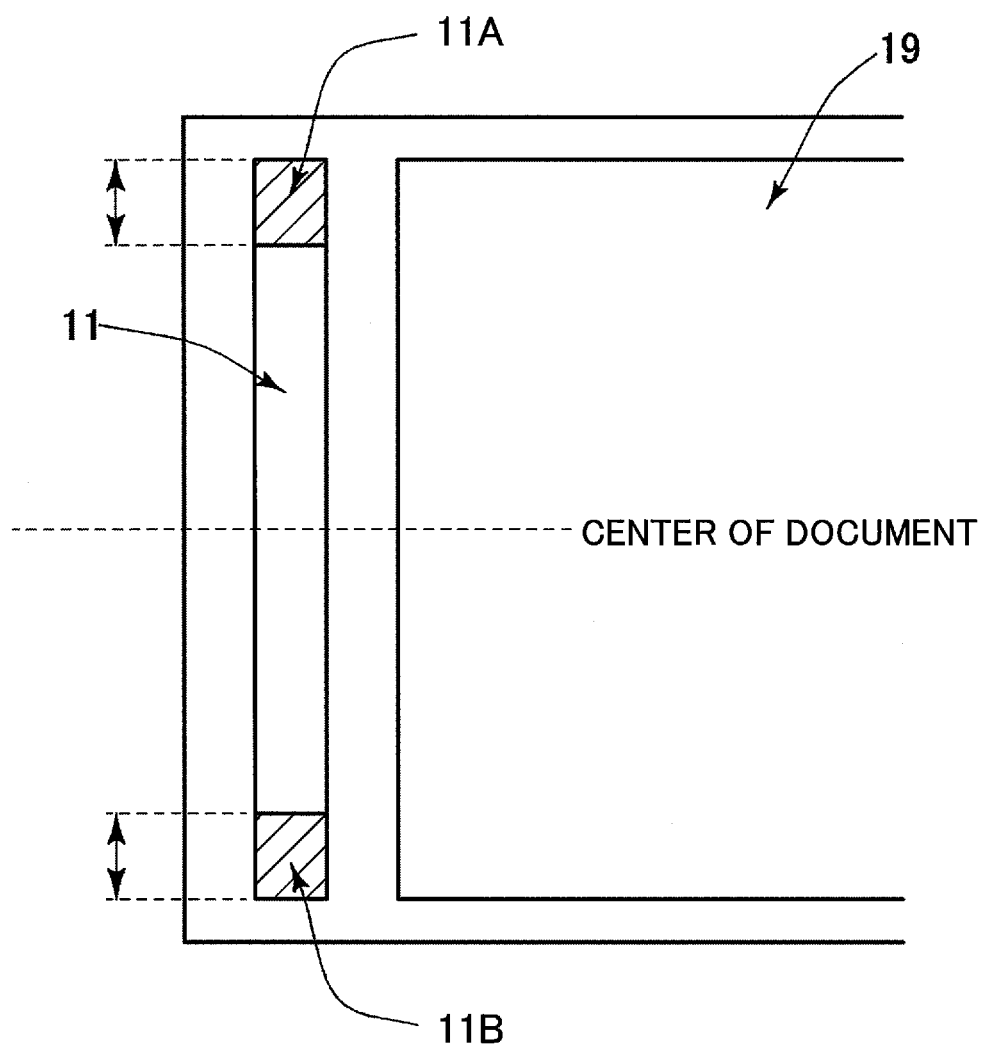
FIG. 6 is a plan view of an ADF platen and an FB platen.

A floating quantity of the document 4 may be measured by using a plurality of light receiving elements 20a which are portions of the plurality of light receiving elements 20. Referring to FIG. 6, the contact glass 11 may be formed with a length greater than a width of the document. Areas 11A and 11B of the contact glass 11 may be regions outside the document 4. Accordingly, when the document 4 passes the contact glass 11, the plurality of light receiving elements 20a corresponding to the area 11A and 11B of the contact glass 11 are not used for reading the document 4. The plurality of light receiving elements 20a may be one of or both of portions at both ends of the plurality of light receiving elements 20. The guide plate 12 may be read by using the plurality of light receiving elements 20a which are not used for reading the document 4.

Figures 7A, 7B:
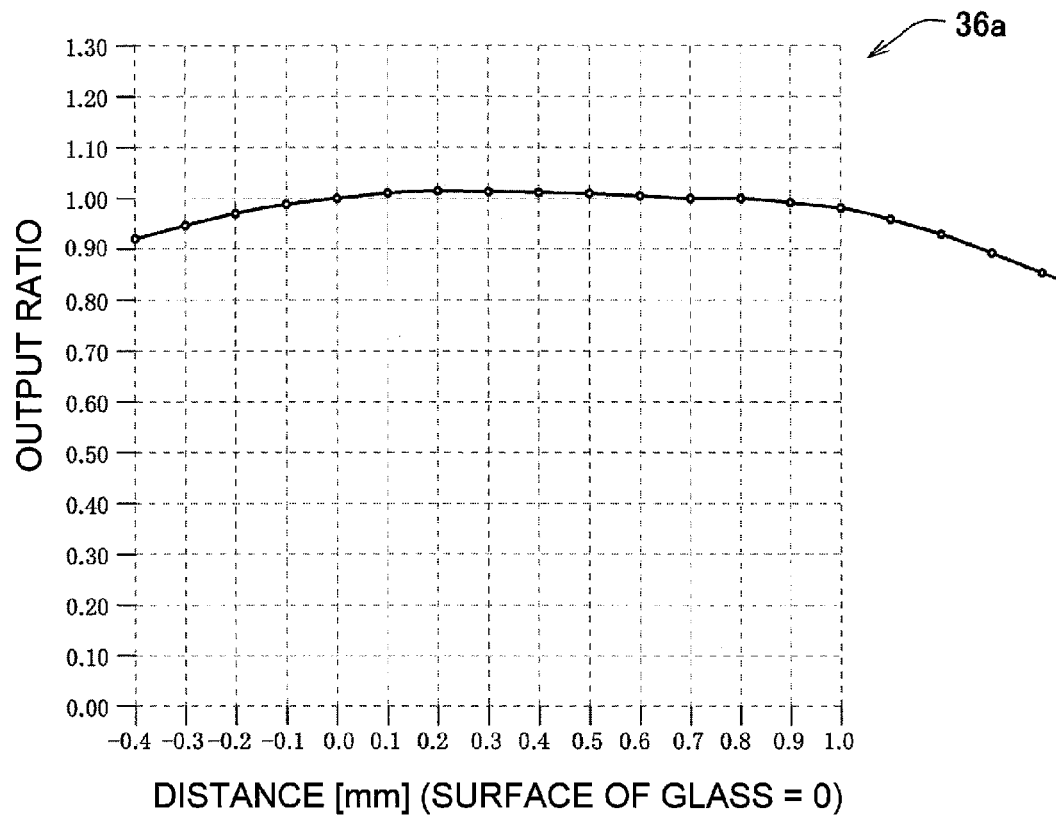
FIG. 7A is a graph of a relationship between a floating quantity of a document and an output ratio of image signals.
FIG. 7B is an example of an emphasis parameter table.

Referring to FIG. 7A, the distance from the guide plate 12 to a surface of the contact glass 11 is taken on an axis of an abscissas, and a value which is obtained by dividing the output of the image signal from the plurality of light receiving element 20 with a corresponding output when the distance is 0.0 mm is taken on an axis of ordinates. As may be understood from the graph, the output ratio when the distance is 0.0 mm, i.e., a state in which the guide plate 12 contacts the contact glass 11, is 1.0, and when the guide plate 12 floats, the output ratio increases. Further, it may be understood from the graph that the output ratio is a maximum value in the vicinity of the distance being 0.2 mm, and the output ratio decreases when the guide plate 12 floats further.

By reading the guide plate 12 using the plurality of light receiving elements 20a when the document 4 is conveyed, and by measuring the output of the image signal, the floating quantity of the guide plate 12 may be obtained based on the relationship shown in FIG. 7A. Then, predetermined correction processing may be applied to the read image of the document 4 corresponding to the floating quantity of the guide plate 12.

Figure 8:
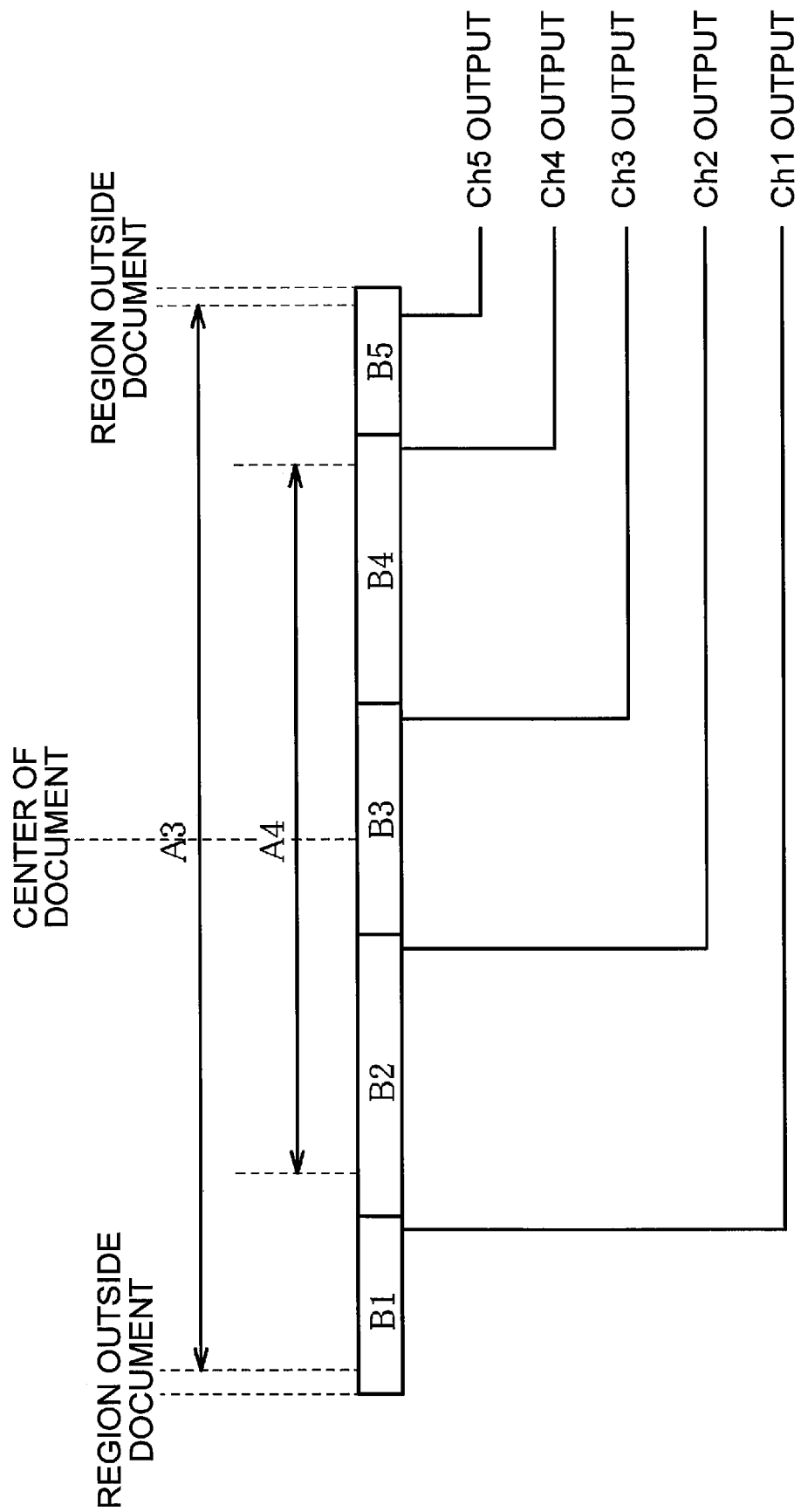
FIG. 8 is an explanatory view of a positional relationship between a block of the image sensor and the document.

Referring to FIG. 8, in reading the document 4 of A4 size, the blocks B2-B4 may be used for reading the image, and the image signals may be outputted from the output terminals Ch2-Ch4. In contrast, in reading the document 4 of A3 size, the plurality of light receiving elements 20 of the blocks B1-B5 may be used for reading the image, and the image signals may be outputted from the output terminals Ch1-Ch5. Then, the plurality of light receiving elements 20a in the blocks B1 and B5 may be used for measuring the floating quantity of the guide plate 12. Further, the plurality of light receiving elements 20 in some of the B2 and B4 blocks and the blocks B1 and B5 may be used for measuring the floating quantity of the guide plate 12 in case of A4 size document 4.

To perform the emphasis processing or the smoothing processing, a filter shown in FIG. 9A, for example, may be prepared, and an arithmetic operation shown in FIG. 9C may be performed using the pixel data values, e.g., image signals outputted from the plurality of light receiving elements 20) shown in FIG. 9B. Moreover, the degrees of emphasis and smoothness may be altered by altering the numerical values of the filters. Here, although a 3×3 filter is used in the example shown in FIG. 9A, a 5×5 filter, a 7×7 filter, or the like may be used.

Figure 10A:
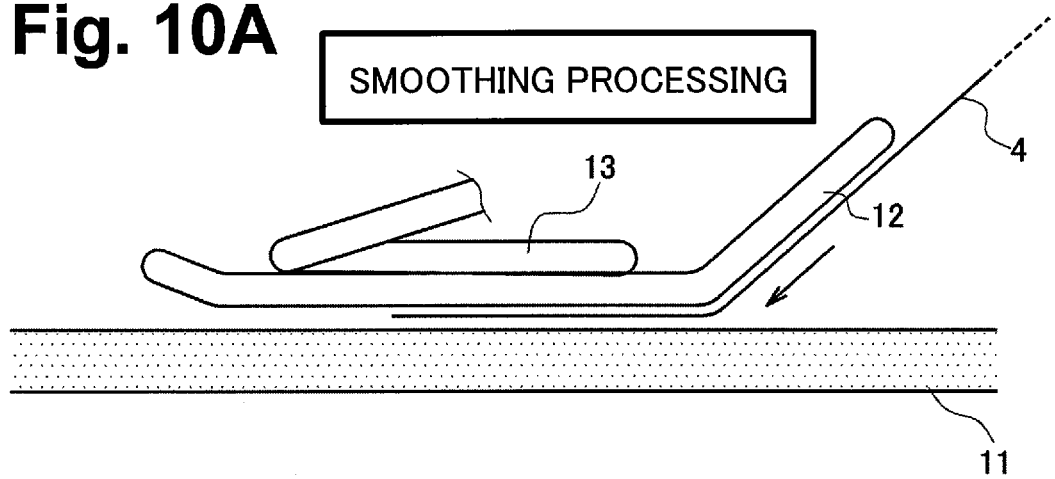
FIG. 10A is a cross-sectional view of a guide plate and a contact glass during a smoothing processing.
Figure 10B:
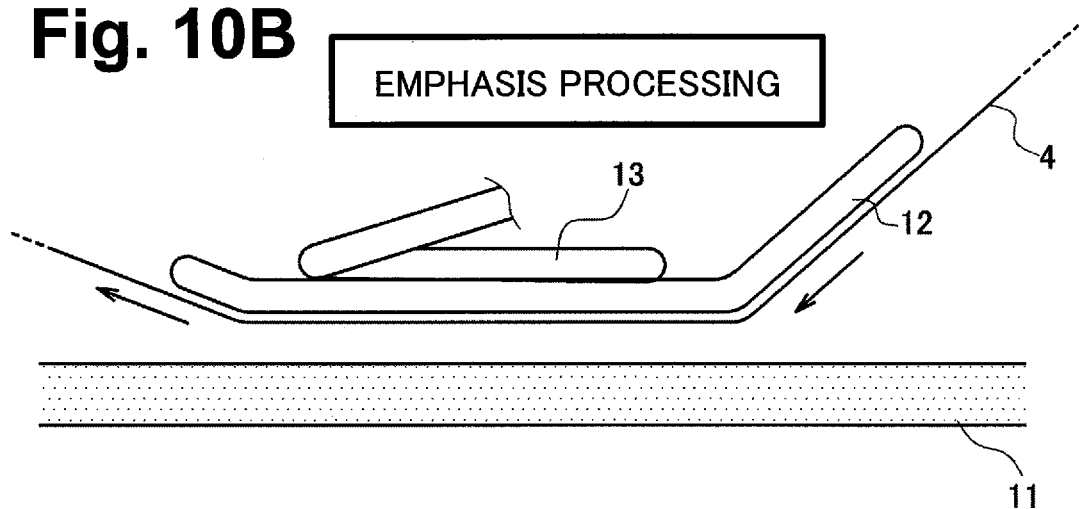
FIG. 10B is a cross-sectional view of a guide plate and a contact glass during an emphasis processing.

Referring to FIG. 10A, when the document 4 is conveyed, a distal end of the document 4 passes between the contact glass 11 and the guide plate 12. At this point of time, the guide plate 12 and the document 4 may be pushed due to a biasing force of the spring member 13, and hence, an image of high resolution may be obtained. Thereafter, when a center portion of the document 4 passes between the contact glass 11 and the guide plate 12, as shown in FIG. 10B, the guide plate 12 floats due to the resiliency of the document 4, and the accurate focusing may not obtained. Then, when a rear end of the document 4 passes between the contact glass 11 and the guide plate 12 as shown in FIG. 10C, the document 4 again may be pushed, and hence, an image of high resolution may be obtained.

Figure 10C:
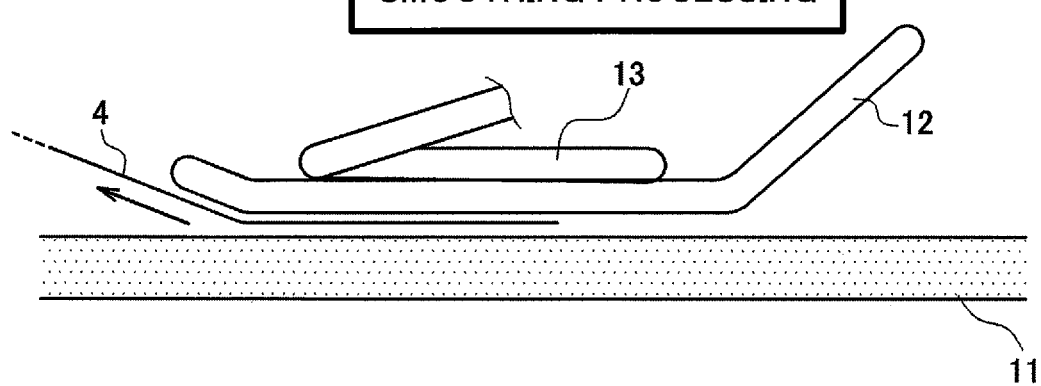
FIG. 10C is a cross-sectional view of a guide plate and a contact glass during a smoothing processing.

A correction quantity of the image may be changed corresponding to the floating quantity of the document 4. For example, as shown in FIG. 10B, the emphasis processing may be applied when the floating quantity of the document 4, i.e., the distance from the plurality of light receiving element 20 to the document 4, is greater than a predetermined range, and as shown in FIG. 10A and FIG. 10C, when the floating quantity of the document 4 is less than the predetermined range, the smoothing processing may be applied. When the floating quantity of the document 4 falls within a predetermined range, neither the emphasis processing nor the smoothing processing may be performed. Because of such processing, which has uniform resolution may be obtained. It may be applicable if a maximum value of the predetermined range and a minimum value of the predetermined range are same.

Figure 11A:
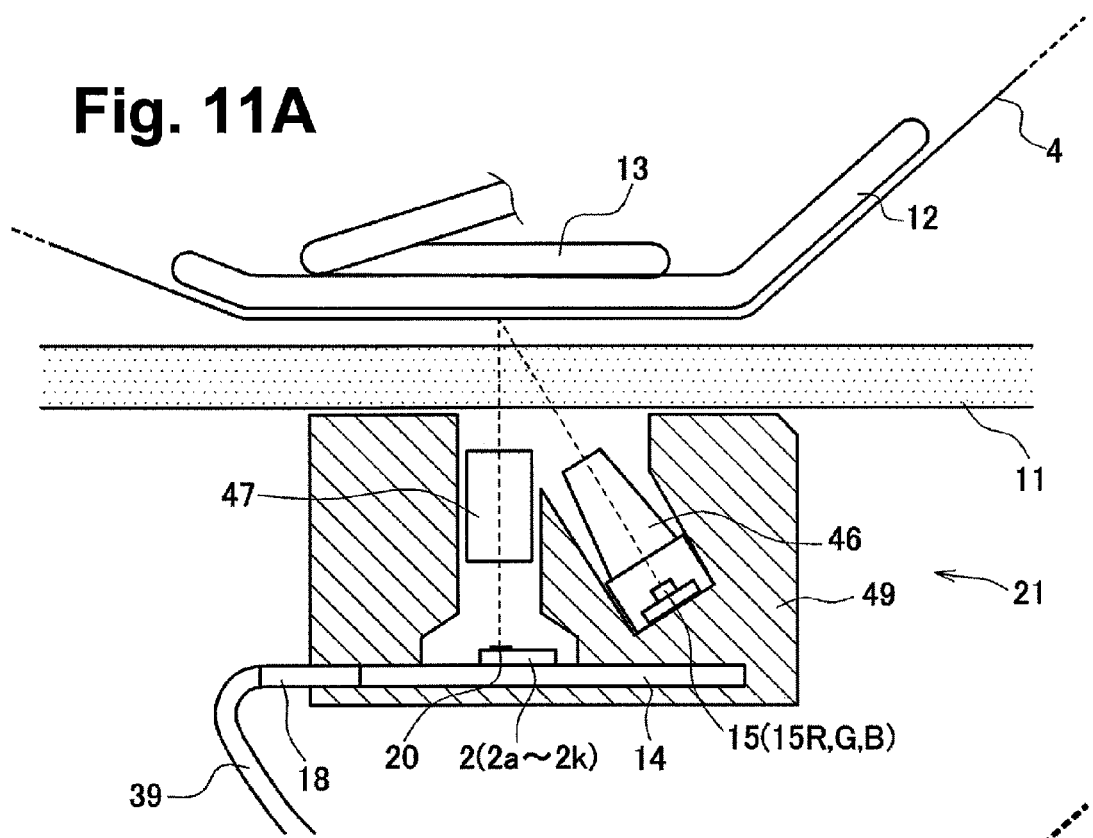
FIG. 11A is an explanatory view of when a relatively thin document is used.
Figure 11B:
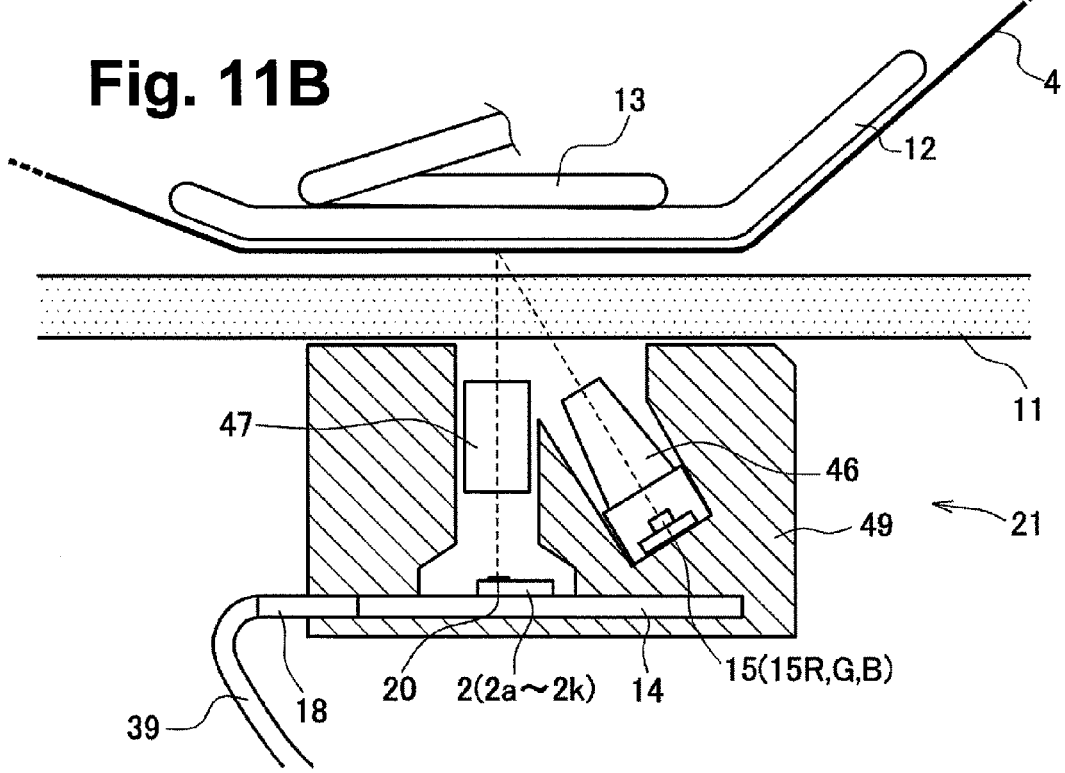
FIG. 11B is an explanatory view of when a relatively thick document is used.

On the other hand, when the thickness of the document 4 is relatively thin, as shown in FIG. 11A, the surface of the guide plate 12 and the surface of the document 4 may be substantially at the same height, and hence, the correction quantity of the image may be determined by taking only the floating quantity of the guide plate 12 into consideration. Nevertheless, when the thickness of the document 4 is relatively thick, as shown in FIG. 11B, if the correction quantity of the image is determined by taking only the floating quantity of the guide plate 12 into consideration, accurate focusing may not be obtained. Accordingly, by allowing the setting of the thickness of the document 4, the correction quantity of the image may be determined based on the floating quantity of the guide plate 12 and the thickness of the document 4. For example, the correction quantity of the image may be determined by subtracting the thickness of the document 4 from the floating quantity of the guide plate 12. Further, when the thickness of the document 4 is relatively thick, the document may approach the image sensor 21 further closer due to the rigidity of the document. The correction quantity of the image may be determined also by estimating such a case.

The user may set the thickness of the document 4 using the manipulation unit 23, or alternatively, a sensor which detects the thickness of the document 4 may be provided so as to automatically detect the thickness of the document 4.

Further, types of the document 4 may be set and the correction processing of the image may be performed on a condition that the document 4 having relatively large resiliency, such as ink jet special paper or glossy paper, is set.

Referring to FIG. 16, a table 50 in which types and thicknesses of the document 4 are made to correspond to each other may be preliminarily stored. Further, the user may set the types of the document 4. The thickness corresponding to the kind of the set document 4 may be read from the table 50, and the correction quantity of the image may be determined based on the floating quantity of the guide plate and the thickness of the document 4. Due to such processing, even when the user does not know the thickness of the document, the user may accurately perform the correction of the image. Here, the table 50 may be stored in the ROM 32, for example.

Figure 12:
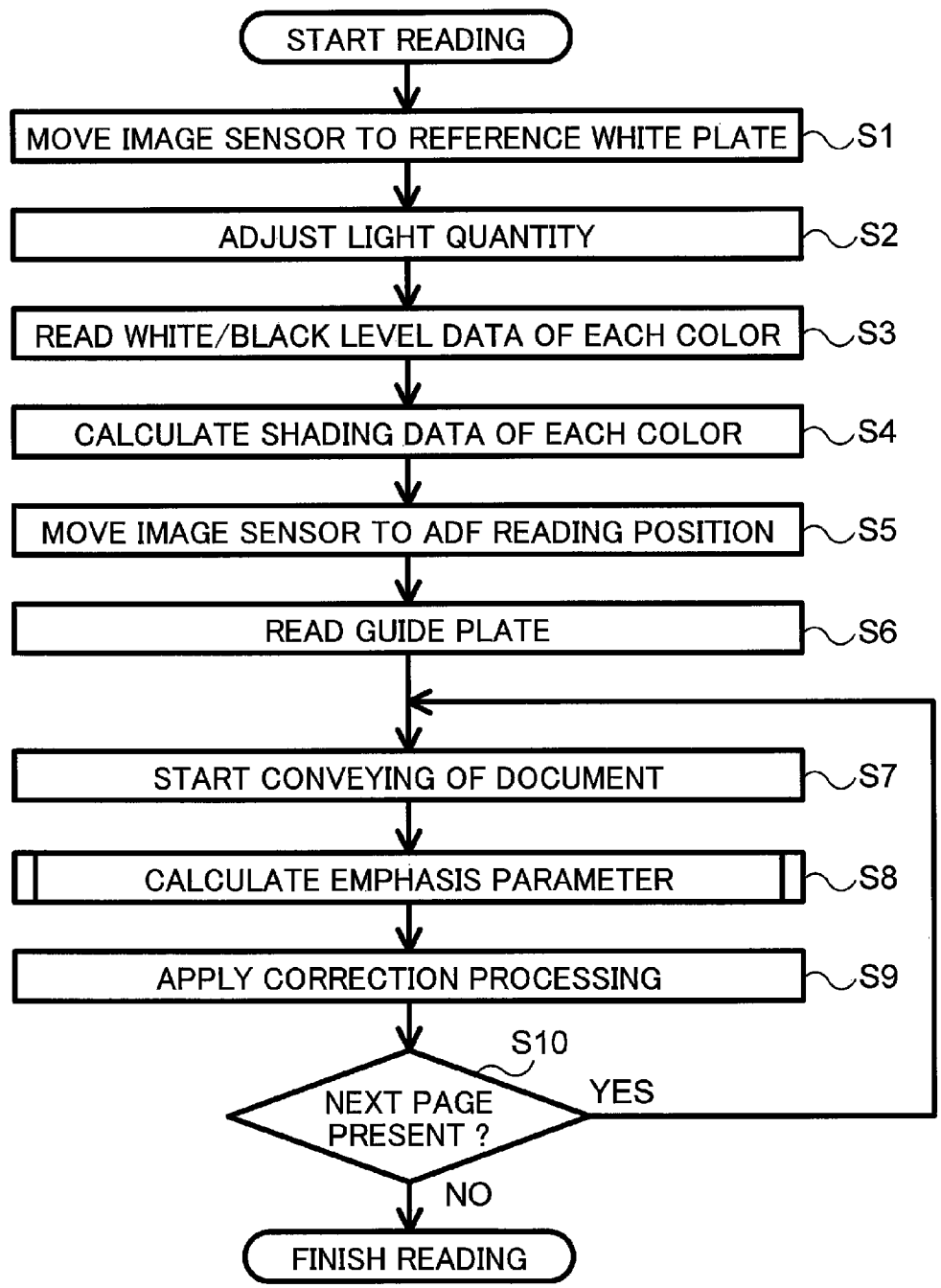
FIG. 12 is a flow chart of an operation of the image reader of FIG. 1.
Figure 13:
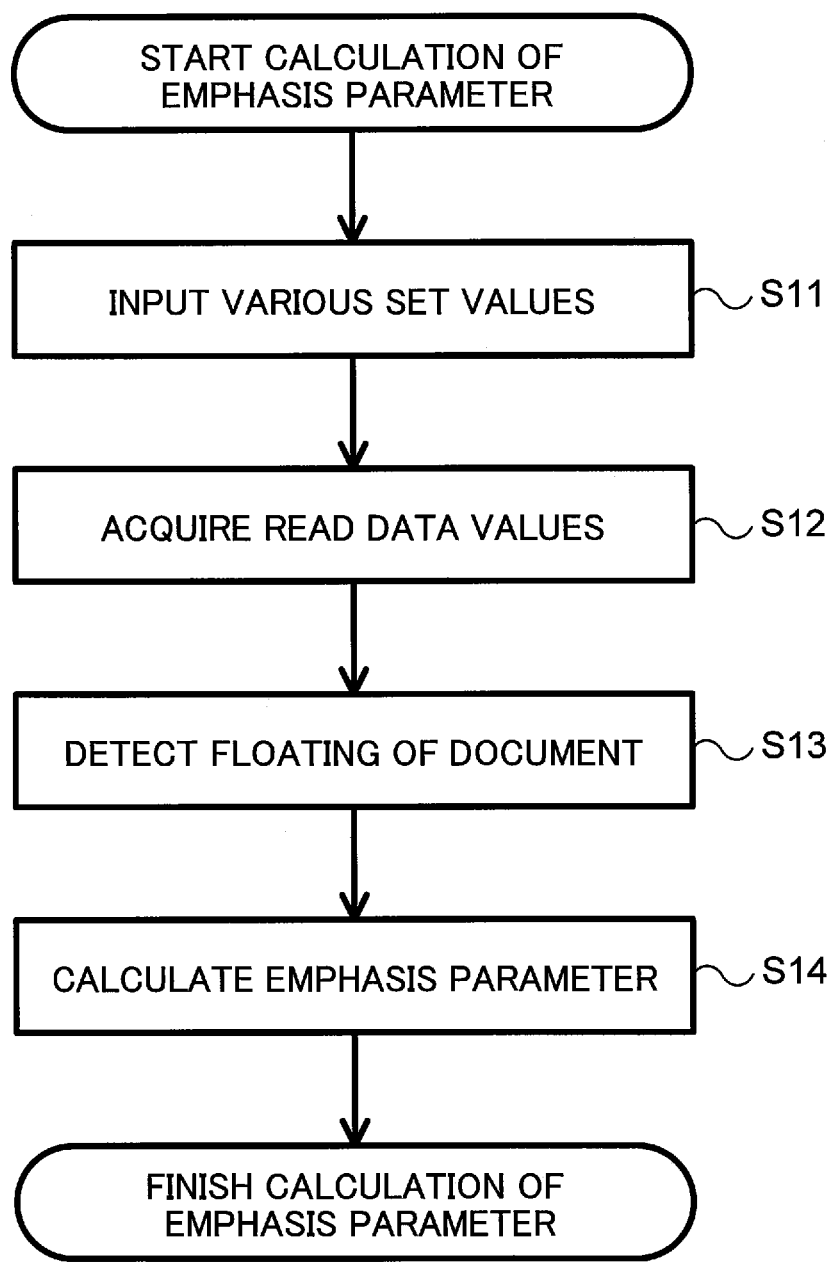
FIG. 13 is a flow chart for calculating an emphasis parameter.

Referring to FIGS. 12 and 13, the image sensor 21 may be moved to a position of the reference white plate 16 (S1) and the light quantity adjustment is performed (S2). Thereafter, the reading of respective color white-black level data may be performed (S3), and respective color shading data may be calculated (S4), thus adjusting the white reference. Then, the processing returns to step S5 in which the image sensor 21 is moved to the ADF reading position, e.g., below the contact glass 11, and the reading of the guide plate 12 may be performed in step S6. Due to the processing in step S6, the output value of the image signal when the guide plate 12 is read in a state that the document 4 is not conveyed may be obtained.

Thereafter, the processing advances to step S7 in which the conveying of the document 4 begins. Then, in step S8, the detection of the floating quantity of the document 4 and the determination of the correction processing corresponding to the floating quantity (calculation of emphasis parameter) may be performed.

Step S8 is explained in detail in FIG. 13. First of all, in step S11, various set values, such as information on which the plurality of light receiving elements 20a are used for reading the guide plate 12 may be inputted. When, in step S12, the guide plate 12 is read in a state that the document 4 is conveyed, and the output value of the image signal is obtained. Further, the reading of the image of the document 4 may be also simultaneously performed. Here, for example, among the light receiving elements 20 which are arranged in a line, the reading of the image of the document 4 may be performed by the plurality of light receiving elements 20 (20b shown in FIG. 4) arranged at the center, and the reading of the guide plate 12 may be performed by the plurality of light receiving elements 20a positioned at both ends.

Thereafter, the processing advances to step S13 in which the floating quantity of the document is detected. Here, the output ratio may be obtained by using the output value (obtained in step S6) when the guide plate 12 is read in a state that the document 4 is not conveyed and the output value (obtained in step S12) when the guide plate 12 is read in a state that the document 4 is conveyed. Here, for example, it is determined that the floating of the document 4 is present when the output ratio is greater than 1, and the floating of the document 4 is not present when the output ratio is less than 1.

Thereafter, the processing advances to step S14 in which the emphasis parameter is calculated. Here, for example, the emphasis parameter table shown in FIG. 7B is preliminarily prepared and the emphasis parameter is changed depending on whether the floating of the document 4 is present or not present. For example, the filter for emphasis processing (see FIG. 9E) may be selected or the filter for smoothing processing (see FIG. 9D) may be selected.

Here, in step S13, the graph shown in FIG. 7A may be preliminarily stored and how many mm the document 4 is floated may be calculated using the graph and the obtained output ratio. Further, a plurality of filters may be prepared for applying the emphasis processing or the smoothing processing. In step S14, the filter may be selected corresponding to the floating quantity of the document 4.

Referring to FIG. 12, after calculating the emphasis parameter, the processing advances to step S9 and the correction processing may be applied to the image signal of the document 4. Thereafter, in step S10, it is determined whether or not a next page exists. Here, if the next page exits, the processing returns to S7 in which the reading of the next document 4 is performed.

The calculation of the emphasis parameter in step S8 and the correction processing in step S9 may be collectively performed for every 1 page of the document, or may be performed in parallel with the document reading operation. By performing the calculation of the emphasis parameter in step S8 and the correction processing in step S9 a plurality of times in the sub scanning direction within 1 page of the document, the image of favorable quality may be even when the distance L from the light receiving element 20 to the document 4 fluctuates during reading of the document.

While the invention has been described in connection with exemplary embodiments, it will be understood by those skilled in the art that other variations and modifications of the exemplary embodiments described above may be made without departing from the scope of the invention. Other embodiments will be apparent to those skilled in the art from a consideration of the specification or practice of the invention disclosed herein. It is intended that the specification and the described examples are considered merely as exemplary of the invention, with the true scope of the invention being indicated by the flowing claims.

The invention claimed is:

1. An image reader comprising:
   a document feeding mechanism configured to feed a document through a document reading position;
   an image sensor comprising a plurality of light receiving elements configured to receive light from the document fed at the document reading position and to convert the light into image signals;
   means for determining a distance, in a light-traveling direction in which the light travels from the document to the plurality of light receiving elements, between the document fed at the document reading position and the plurality of light receiving elements of the image sensor at a plurality of different positions of the document when the document is being fed through the document reading position;
   means for selecting at least one correction process based at least on the distance between the document fed at the document reading position and the plurality of light receiving elements of the image sensor at the plurality of different positions of the document; and
   means for applying the selected at least one correction process to the image signals.

2. The image reader of claim 1, further comprising a guide plate configured to guide the document fed at the document reading position, wherein at least a portion of the plurality of light receiving elements are further configured to read the guide plate, and the means for determining the distance between the document fed at the document reading position and the light receiving elements comprises a processor configured to determine the distance between the document fed at the document reading position and the light receiving elements at least based on a floating quantity associated with the guide plate, and output values associated with the image signals.

3. The image reader of claim 2, wherein the plurality of light receiving elements comprises a first plurality of light receiving elements, a second plurality of light receiving elements, and a third plurality of light receiving elements positioned between the first plurality of the light receiving elements and the second plurality of the light receiving elements, wherein the at least a portion of the plurality of light receiving elements comprises the first plurality of light receiving elements.

4. The image reader of claim 3, wherein the at least a portion of the plurality of light receiving elements further comprises the second plurality of light receiving elements.

5. The image reader of claim 1, wherein the means for applying is configured to apply an emphasis process to the image signals when the distance between the document and the light receiving elements is greater than a maximum distance value of a predetermined distance range.

6. The image reader of claim 5, wherein the means for applying is configured to apply a smoothing process to the image signals when the distance between the document and the light receiving elements is less than a minimum distance value of the predetermined distance range.

7. The image reader of claim 6, wherein the maximum distance value of the predetermined distance range is equal to the minimum distance value of the predetermined distance range.

8. The image reader of claim 1, wherein the means for applying is configured to apply a smoothing process to the image signals when the distance between the document and the light receiving elements is less than a minimum distance value of a predetermined distance range.

9. The image reader of claim 1, wherein the image reader further comprises means for determining a thickness of the document, and the means for selecting further selects the at least one correction process based at least on the thickness of the document.

10. The image reader of claim 9, wherein the means for determining the thickness of the document is configured to determine the thickness of the document based on a user-inputted type of the document.

11. The image reader of claim 1, wherein the means for determining the distance between the document and the plurality of light receiving elements continuously determines the distance between the document and the plurality of light receiving elements as the document moves.

12. The image reader of claim 11, wherein the means for selecting continuously selects the correction process based at least on the distance between the document and the plurality of light receiving elements.

13. The image reader of claim 1, wherein the light receiving elements are arranged in a line.

14. The image reader of claim 1, further comprising a lens array through which the light from the document fed at the document reading position passes toward the plurality of light receiving elements.

15. An image reader comprising:
   a document feeding mechanism configured to feed a document through a document reading position;
   an image sensor comprising a first plurality of light receiving elements configured to receive light from the document fed at the document reading position and to convert the light into image signals;
   a guide plate configured to guide the document fed at the document reading position;

a second plurality of light receiving elements configured to read the guide plate;

means for determining a distance, in a light-traveling direction in which the light travels from the document to the first plurality of light receiving elements, between the document fed at the document reading position and the first plurality of light receiving elements of the image sensor at a plurality of different positions of the document when the document is being fed through the document reading position;

means for selecting at least one correction process based at least on the distance between the document fed at the document reading position and the first plurality of light receiving elements of the image sensor at the plurality of different positions of the document; and means for applying the selected at least one correction process to the image signals.

16. The image reader of claim 15, further comprising a third plurality of light receiving elements configured to receive light from the document fed at the document reading position, to convert the light into image signals, and to read the guide plate.

17. The image reader of claim 16, wherein the means for determining the distance between the document fed at the document reading position and the first plurality of light receiving elements comprises a processor configured to determine the distance between the document fed at the document reading position and the first plurality of light receiving elements at least based on a floating quantity associated with the guide plate, and output values associated with the image signals.

18. The image reader of claim 15, wherein the means for determining the distance between the document fed at the document reading position and the first plurality of light receiving elements comprises a processor configured to determine the distance between the document fed at the document reading position and the first plurality of light receiving elements at least based on a floating quantity associated with the guide plate, and output values associated with the image signals.

19. The image reader of claim 15, wherein the means for applying is configured to apply an emphasis process to the image signals when the distance between the document and the first plurality of light receiving elements is greater than a maximum distance value of a predetermined distance range.

20. The image reader of claim 19, wherein the means for applying is configured to apply a smoothing process to the image signals when the distance between the document and the first plurality of light receiving elements is less than a minimum distance value of the predetermined distance range.

21. The image reader of claim 20, wherein the maximum distance value of the predetermined distance range is equal to the minimum distance value of the predetermined distance range.

22. The image reader of claim 15, wherein the means for applying is configured to apply a smoothing process to the image signals when the distance between the document and the first plurality of light receiving elements is less than a minimum distance value of a predetermined distance range.

23. The image reader of claim 15, wherein the image reader further comprises means for determining a thickness of the document, and the means for selecting further selects the at least one correction process based at least on the thickness of the document.

24. The image reader of claim 23, wherein the means for determining the thickness of the document is configured to determine the thickness of the document based on a user-inputted type of the document.

25. The image reader of claim 15, wherein the means for determining the distance between the document fed at the document reading position and the first plurality of light receiving elements continuously determines the distance between the document fed at the document reading position and the first plurality of light receiving elements as the document moves.

26. The image reader of claim 15, wherein the means for selecting continuously selects the correction process based at least on the distance between the document and the first plurality of light receiving elements.

27. The image reader of claim 15, wherein the light receiving elements are arranged in a line.

28. The image reader of claim 15, further comprising a lens array through which the light from the document fed at the document reading position passes toward the plurality of light receiving elements.

* * * * *